UNITED STATES PATENT OFFICE.

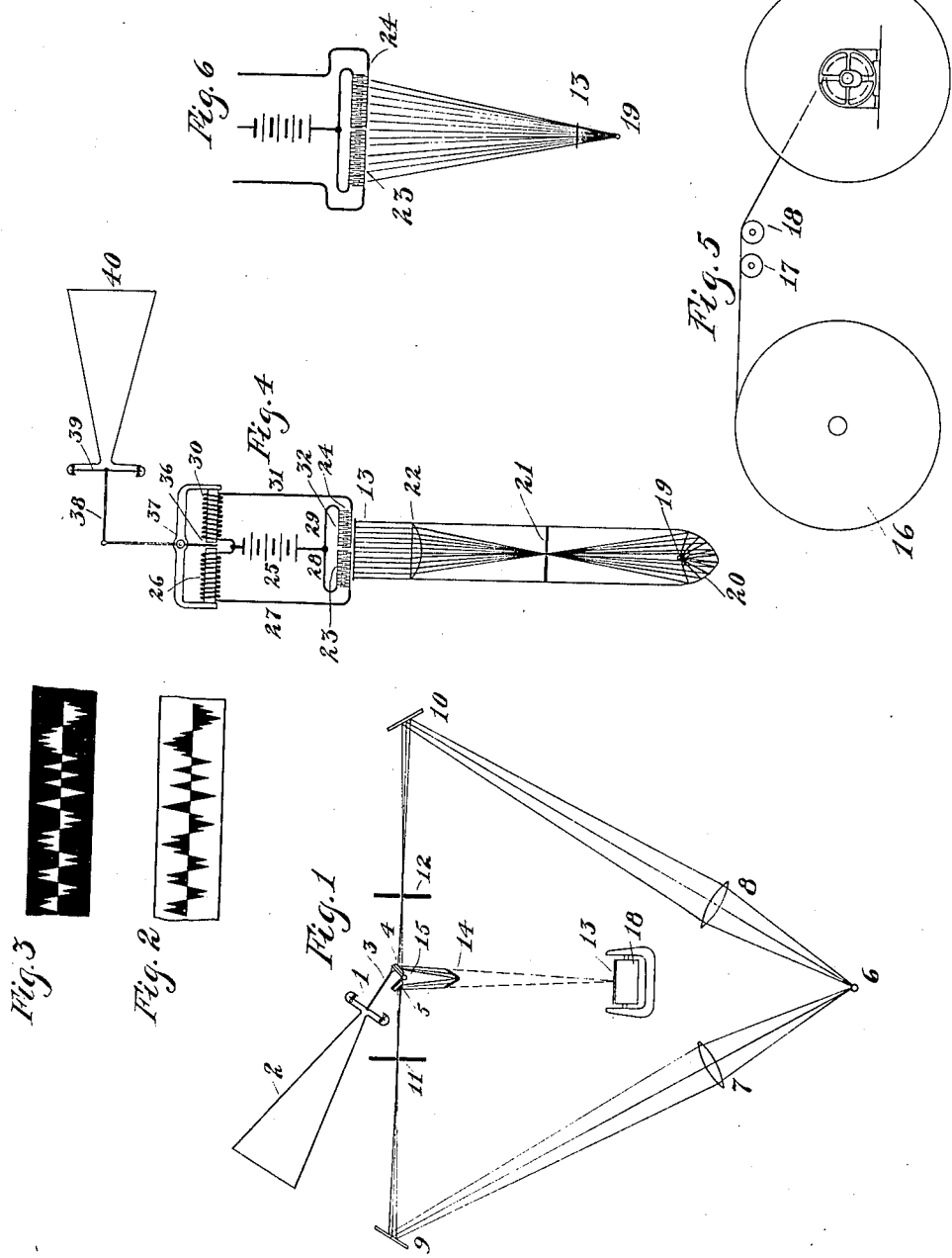

FRANK W. ADSIT, OF ST. PAUL, MINNESOTA.

PHOTOGRAPHIC PHONOGRAPH.

1,291,702.

Specification of Letters Patent.   Patented Jan. 21, 1919.

Application filed December 4, 1916.   Serial No. 135,265.

*To all whom it may concern:*

Be it known that I, FRANK W. ADSIT, a citizen of the United States, residing at St. Paul, in the county of Ramsey and State of Minnesota, have invented certain new and useful Improvements in Photographic Phonographs, of which the following is a specification.

One object of my invention is to provide means for registering on a film, graphic representations of sound waves.

Another object of my invention is to provide means for registering on a film, graphic representations of sound waves in such manner as to have the graphic representation clearly defined and of as great amplitude as possible.

Another object of my invention is to provide means in connection with a sensitized film such that light reflected from a mirror may be registered on the film on one side of the center line thereof when the reflecting mirror moves in one direction from its normal position, and on the other side of the center line of the film when the mirror moves to the other side of its normal position.

Another object of my invention is to provide means whereby graphic representations of musical tones or voice currents on the film may be again reproduced into similar musical tones or voice currents.

Another object of my invention is to provide means wherein a film having a centrally divided graphic record thereon may be introduced to reproducing means, and each half of the film actuated independently in the reproducing means.

With these and incidental objects in view the invention consists of certain novel features of construction and combination of parts, the essential elements of which are hereinafter described with reference to the drawing which accompanies and forms a part of this specification.

In the drawings Figure 1 is a schematic view of my recording means, and Fig. 2 is a negative film produced by my recording means. Fig. 3 is a positive produced from the negative in Fig. 2, Fig. 4 is a schematic representation of my reproducing means, and Fig. 5 is a schematic representation of my film winding means. Fig. 6 is a wiring diagram showing a different application of lighting of my producing means.

The diaphragm 1, Fig. 1, mounted in the horn 2 of ordinary construction, carries a link 3 to which is hinged a double angle mirror having faces 4 and 5.

6 is a source of light, and light rays therefrom passing through the lenses 7 and 8 are projected by the mirrors 9 and 10, respectively, through the stops 11 and 12 on to the mirror faces 4 and 5, respectively.

The light rays from the mirrors 4 and 5 are normally cut off from the film 13 by the stop 14, but it is apparent that if the diaphragm 1 is moved downwardly the mirrors 4 and 5 will be turned angularly about their common support 15, and a certain amount of light will be projected from the mirror 5 on to the film 13, but no light from the mirror 4 will reach the film 13, also if the diaphragm is moved upwardly part of the light from the mirror 4 will fall on the film 13, while none of the light from the mirror 5 will reach the film, in each case the light from the non-active mirror being shut off by the stop 14.

It is evident, therefore, that if the diaphragm 1 vibrates, as under the influence of a voice or musical tone, a certain amount of light will be projected on the film 13, and the position and amount of light received on the film will depend upon the position occupied by the diaphragm 1 at any one particular instant, the result being a film similar to that shown in Fig. 2, and a positive from that negative would be similar to that shown in Fig. 3.

The film would preferably wind from a spool 16, Fig. 5, by any suitable means over rollers 17 and 18 on to a spool 19, run at suitable speed.

With a positive similar to the one shown in Fig. 13 passed through my reproducing means, shown in Figs. 4 and 6 in a similar manner to that illustrated in Fig. 5, the result accomplished will be as follows:

Light from a source 19 is reflected by means of a parabolic mirror 20 through a stop 21 through the rectilinear lens 22 on to the film 13.

The selenium cells 23 and 24 are positioned behind the film 13 to receive a varying amount of light therefrom, as the film is passed before it and an electrical circuit is established as follows:

Battery 25, reproducer coil 26, wire 27, selenium cell 23, wires 28 and 29 to the other side of the battery 25 and also from the battery 25 through the reproducing coil 30, wire 31, selenium cell 24, wires 32, 29, to the other side of the battery 25, and the operating coils 26 and 30 being of similar winding, and the selenium cells 23 and 24 being of similar resistance when receiving the same amount of light, the armature 36 will be balanced between the operating coils.

When, however, at a certain point on the film light is passed through the film on the side in front of the selenium cell 23 its resistance will be lowered and the coil 26 will receive more current than the coil 30, and hence the armature 36 will be pulled toward that coil.

The next instant the film allows a greater amount of light to pass on to the selenium cell 23, and the pull on the lever will be still further increased; if, on the other hand, the amount of light is less or if light is passed through the film on to the selenium cell 24, armature 26 will be pulled toward the coil 30, and as the armature which is pivoted to the frame of the instrument at 37 is attached by the link 38 to the diaphragm 39 and the reproducing horn 40, it is evident that the diaphragm will be vibrated in accordance with the record on the film and as the record consists of two half records placed side by side there will be a strong magnetic pull in the two coils varying in intensity according to the amount of light received, and that when one of the selenium cells is receiving light the other selenium cell will receive no light whatever, and vice versa.

The film 13 in Fig. 6 is positioned at a considerable distance from the selenium cells 23 and 24, so as to allow light from a source 19 to cover a larger amount of selenium cell surface, the connection otherwise being similar.

While I have described my invention and illustrated it in one particular design, I do not wish it understood that I limit myself to this construction, as it is evident that the application of my invention may be varied in many ways within the scope of the following claims.

Claims:

1. In a reproducer for photographic phonographs the combination of a source of electrical energy, two resistances variable with the amount of light received thereon and two electro-magnetic means electrically connected with said variable resistances and said source of electrical energy, and means for vibrating a diaphragm through an electro-magnetic action of said coils.

2. In a reproducer for photographic phonographic films the combination of two selenium cells, adapted to be positioned adjacent to the film, a source of light adapted to be projected on to said selenium cells through certain portions of said photographic phonographic film, one of said selenium cells being under the influence of one-half of the film longitudinally and the other under the other half of the film longitudinally, an electro-magnetic coil associated with each of said selenium cells, a source of electrical energy associated with said selenium cells and said electro-magnetic coils, an armature associated with said electro-magnetic coils, and a diaphragm actuated by said armature.

3. In a reproducer for photographic phonographs the combination of a source of electrical energy, two resistances variable with the amount of light received thereon, two electro-magnetic means electrically connected with said resistances and said source of electrical energy, means for projecting on said resistances variable light rays, a diaphragm and means controlled by said two electro-magnetic means for vibrating said diaphragm.

FRANK W. ADSIT.